(12) United States Patent
Thoma et al.

(10) Patent No.: US 11,407,549 B2
(45) Date of Patent: Aug. 9, 2022

(54) CONTAINER MADE OF INJECTION MOLDED PLASTIC

(71) Applicant: Rotho Kunststoff AG, Wurenlingen (CH)

(72) Inventors: Christian Thoma, Albbruck (DE); Bruno Meier, Untersiggenthal (CH); Marc Binder, Baldingen (CH)

(73) Assignee: Rotho Kunststoff AG, Würenlingen (CH)

( * ) Notice: Subject to any disclaimer, the term of this patent is extended or adjusted under 35 U.S.C. 154(b) by 60 days.

(21) Appl. No.: 16/683,653

(22) Filed: Nov. 14, 2019

(65) Prior Publication Data
US 2020/0165026 A1 May 28, 2020

(30) Foreign Application Priority Data
Nov. 23, 2018 (EP) .................................... 18208098

(51) Int. Cl.
| | |
|---|---|
| *B65D 1/22* | (2006.01) |
| *B65D 43/02* | (2006.01) |
| *B65D 21/02* | (2006.01) |
| *B65D 85/34* | (2006.01) |

(52) U.S. Cl.
CPC ............ *B65D 1/22* (2013.01); *B65D 43/022* (2013.01); *B65D 21/0233* (2013.01); *B65D 85/34* (2013.01); *B65D 2205/02* (2013.01); *B65D 2543/00194* (2013.01); *B65D 2543/00296* (2013.01)

(58) Field of Classification Search
CPC .... B65D 1/22; B65D 43/022; B65D 51/1616; A47J 47/10; A23B 7/152
USPC ............................................. 220/371, 495.03
See application file for complete search history.

(56) References Cited

U.S. PATENT DOCUMENTS

| | | | |
|---|---|---|---|
| 2004/0011794 A1 | 1/2004 | Heil et al. | |
| 2012/0241450 A1 | 9/2012 | Domburg et al. | |
| 2018/0192827 A1* | 7/2018 | Fox, III | ................. B65D 43/02 |
| 2019/0062011 A1* | 2/2019 | Leo | ......................... A47J 47/10 |
| 2019/0084756 A1* | 3/2019 | Maxwell | .............. B65D 43/022 |

FOREIGN PATENT DOCUMENTS

DE   202016104490   10/2016

* cited by examiner

*Primary Examiner* — Jeffrey R Allen
(74) *Attorney, Agent, or Firm* — Volpe Koenig

(57) ABSTRACT

A container made of injection molded plastic, in particular for storing fruit, vegetables or other foods, includes a box having a box base, a side wall and an generally encircling, upper box periphery, which defines a box opening, and also includes a container lid for at least partially closing the box opening. On an inner side, directed toward an inner region of the box, the container lid has a three-dimensional surface structure including a plurality of respectively adjacent hollow bodies, of which the basic shape has a respective bottom surface, arranged on the inner side of the container lid, a top surface, which is oriented in the direction of the inner region of the box, and a lateral surface, which connects the bottom surface and the top surface to one another. At least some of the hollow bodies are open in the direction of the inner region of the box.

16 Claims, 5 Drawing Sheets

CONTAINER MADE OF INJECTION MOLDED PLASTIC

INCORPORATION BY REFERENCE

The following documents are incorporated herein by reference as if fully set forth: European Patent No. 18 208 098.6, filed Nov. 23, 2018.

FIELD OF INVENTION

The present invention relates to a container made of injection molded plastic, in particular for storing fruit, vegetables or other foods. Such a container comprises a box having a box base, a side wall and an essentially encircling, upper box periphery, and also comprises a container lid. Said container lid serves for at least partially closing a box opening, which is circumscribed by the box periphery.

BACKGROUND

A variety of embodiments of this type of container have been known for some time now. They are used, for example, for storing fruit, vegetables or other foods in the refrigerator or at room temperature. For this purpose, these foods are placed, or introduced, into an inner region of the box through the box opening, whereupon the box opening is partially or completely closed by the container lid. This means that the foods are protected from environmental influences while they are being stored.

The moisture which is emitted by the foods while they are being stored, or which is introduced into the container by the foods, is discharged to the ambient air in the inner region of the box. This means that the air humidity in the inner region of the box increases in particular in the case of the box opening being completely closed by the container lid. This increase in the air humidity can result in the formation of condensation, which is deposited in the form of individual drops of condensation in particular on the inner side of the container, said inner side being directed toward the inner region of the box. Since most plastics have predominantly hydrophobic, i.e. water repellent, properties, these drops of condensation, in the case of the containers which are known from the prior art, run off from the container lid and drip onto the foods stored in the inner region of the box. This leads to the foods in the inner region of the box being in constant contact with the condensation, and this can result in the formation of bacteria and molds on the foods, and therefore in the foods perishing prematurely. On account of this, the containers which are known from the prior art are distinguished by being able to store food only for a limited amount of time.

It is therefore the object of the present invention to improve a container of the type mentioned in the introduction by way of optimized storage capability for fruit, vegetables and other foods.

This object is achieved by a container having the features of the independent claim. Preferred configurations and developments of the container according to the invention are set out in the dependent claims.

SUMMARY

A container according to the invention made of injection molded plastic, which is designed in particular for storing fruit, vegetables or other foods, comprises a box having a box base, a side wall and an essentially encircling, upper box periphery, which forms a box opening, and also comprises a container lid for at least partially closing the box opening. The significant factor in respect of the container according to the invention is that on an inner side, which is directed toward the inner region of the box, the container lid has a three-dimensional surface structure. Said three-dimensional surface structure is formed by a plurality of adjacent hollow bodies, of which the basic shape comprises a bottom surface, a top surface and a lateral surface, which connects the bottom surface and the top surface to one another. Said hollow bodies are arranged such that the bottom surface is located on the container lid, whereas the top surface is oriented in the direction of the inner region of the box. The bottom surface of the hollow bodies is formed in each case by the container lid, whereas the top surface is at least partially open, but preferably totally absent. The lateral surface, in contrast, is formed by additional plastic material during the injection molding process.

Fruit, vegetables or other foods (referred to hereinafter, overall, as food or foods) can be placed, or introduced, into the inner region of the box for storage purposes by a person using the container. The at least partial closure of the box opening by means of the container lid allows the foods which are stored in the inner region of the box to be protected against environmental influences. Such an at least partial closure of the box opening is understood to mean that the container lid either completely covers, or closes, the box opening, or that it leaves open, or does not cover, a sub region of the box opening, as a result of which for example foods can be removed from the inner region of the box or introduced into the inner region. The container lid can be designed, for example, in the form of a fit-on lid, which can be positioned on the box periphery or inserted into said box periphery. However, it is also possible within the context of the invention for the container lid to be designed in the form of a hinged lid, which is fastened on one side of the box periphery by way of a hinge element and can be swung shut. However, the invention is not limited thereto.

It has been found, according to the invention, that the action of the condensation running off, and dripping, from the container lid, which was mentioned in the introduction and takes place in the case of the prior art, results from only a small amount of wetting of the hydrophobic plastic surface of the container lid. This small amount of wetting is caused by the force of adhesion between the drops of condensation and the surface of the container lid being relatively small in relation to the forces of cohesion within the drops of condensation.

In contrast, if the air humidity condenses on the inner side of the container lid of a container according to the invention, then, the drops of condensation can be deposited in the region of the lateral surface and of the bottom surface of the hollow bodies, by virtue of the moisture-containing air entering into an interior of the hollow bodies. It is not just the case then that individual drops of condensation formed during the condensing process can form one point of contact with the plastic surface of the container lid, as in the case of an unstructured, essentially planar container lid according to the prior art. Rather, according to the invention, it is possible for the drops of condensation to form a plurality of points of contact with the lateral surface and/or the bottom surface of the hollow body. This formation of a plurality of points of contact results in an increase in the overall force of adhesion between the drops of condensation and the inner side of the container lid. This means that the force of adhesion which acts overall between a drop of condensation and the container lid can be increased such that it is greater than the force of cohesion of the drop of condensation. Consequently, the drop of condensation is retained in the hollow body, as a result of which said drop of condensation is prevented from running off. This can, for example, mean that the individual drop of condensation is partially enclosed by a hollow body, i.e. by the lateral surface and bottom surface thereof, and is thus safeguarded against running off and dripping down onto the foods stored in the inner region of the box. It is additionally the case with such configurations that a drop of condensation of which the size increases and, in the process, covers the entire interior of the hollow body, i.e. is enclosed on all sides by the lateral surface, is retained by the formation of a vacuum beneath the drop when it for example begins to fall downward.

It is thus possible for contact between the foods and the condensation, and also formation of bacteria and mold on the foods, to be reduced or even avoided altogether. The three-dimensional surface structure therefore results in the container according to the invention being able to store foods in an improved manner in relation to the containers which are known from the prior art.

In order to achieve the effect according to the invention, the dimensions of the hollow bodies, which form the three-dimensional surface structure according to the invention, have to be selected such that drops of condensation are also actually retained in the hollow bodies. This can mean adaptation of the volumes of the hollow bodies to the typical dimensions of a drop of condensation, i.e. approximately 40 to 50 microliters, such a drop of condensation within the hollow body therefore being in contact, essentially on all sides, with the lateral surface of the hollow body and, as a result, the contact surface area between the drops of condensation and the material of the three-dimensional surface structure being increased such that the drop of condensation is retained within the hollow body. If the hollow body is designed with a polygonal bottom surface and top surface, and the lateral surface accordingly forms corner regions, it can be sufficient if, in such a corner region, a drop of condensation is in contact with two sides of the lateral surface and the bottom surface of the hollow body, so as to be retained within the hollow body. Accordingly, such a hollow body can then possibly also be designed with a volume which is considerably greater than the volume of a typical drop of condensation.

Designing the volume of the hollow bodies to be smaller than typical volumes of drops of condensation, e.g. 30 to 40 microliters, can have the positive effect that the formation of larger drops of condensation, which could more easily fall downward as a result of their weight, is prevented or made more difficult.

In order further to enhance the effect according to the invention, and in addition to reduce the quantity of plastic required for producing the container, a first advantageous configuration of the container according to the invention provides for essentially all the hollow bodies to be bounded, and separated from adjacent hollow bodies, by their lateral surface. This means that a hollow body shares its lateral surface with the adjacent hollow bodies and those arranged around it. As a result, the lateral surface forms crosspieces between the cavities of the hollow bodies.

In a further advantageous configuration of the container according to the invention, the bottom surface and/or the top surface of the hollow body are/is of polygonal, elliptical or circular design. In the case of a polygonal design, the bottom surface and/or the top surface have/has a number of corner points n, which are connected to one another by an identical number of lines m. The resulting corner regions of the lateral surface can provide for the formation of at least two contact surfaces between the drop of condensation and said corner regions of the lateral surface. If the drop of condensation has, for example, similar dimensioning to the dimensioning of the bottom surface, it is also possible for a higher number of contact surfaces to form between the drop of condensation and the hollow body.

In the case of a polygonal design, the bottom surface and/or the top surface can preferably have a number of corner points n ranging from n=3 to n=10, particularly preferably a number of corner points n=6. In the case of a number of corner points n=6 for the bottom surface and the top surface, the three-dimensional surface structure can be designed in the form of a honeycomb structure on that side of the container lid which is directed toward the inner region of the box. This means that the three-dimensional surface structure can preferably be designed in the form of a reproduction of a naturally occurring honeycomb structure. This is known to optimize the relationship between the sum of the volumes of the hollow bodies and the amount of plastic material required for the crosspiece design lateral surfaces.

In order to minimize yet further the risk of the drops of condensation running off from the container lid, the lateral surface, which bounds the hollow bodies, can preferably have a crosspiece width which is considerably smaller than a diameter of the hollow body. This can minimize, or even prevent altogether, the formation of drops of condensation on the end sides of the crosspieces. Since the drops of condensation on the end sides of the crosspieces can form only one point of contact, or only a small number of points of contact, with the surface of the container lid, this would ultimately cause the condensation to run off and/or drip from the crosspieces onto the foods stored in the inner region of the box. Therefore, a small crosspiece width of the lateral surface, which bounds the hollow bodies, further improves the ability of the container to store foods and, in addition, reduces the amount of material which is necessary for the three-dimensional structure according to the invention.

The invention here provides for the inner side of the container lid to be structured three-dimensionally either completely, or only partially, with hollow bodies. The number of hollow bodies here correlates with the quantity or the volume of condensation which can be retained in the region of the honeycomb structure. Since the diameter of the hollow bodies, or the dimensioning of the latter, correlates with the capability of said hollow bodies to bind the drops of condensation, the hollow bodies, in a preferred development of the container, have an extremely small inside width of 4 to 5 mm, particularly preferably of 4.45 to 4.55 mm.

The hollow bodies here are preferably provided with a depth of 1.5 to 2.5 mm, particularly preferably of 1.8 to 2.0 mm.

In order to simplify the production of the container lid in the injection molding process, a further advantageous configuration of the container according to the invention provides for the bottom surface and the top surface to be essentially congruent in relation to one another. It is possible here for the bottom surface and the top surface to have smaller production-related deviations from this congruent design. For example, the bottom surface can have slightly smaller dimensioning than the top surface, this resulting in the hollow bodies having a conical shape, which is advantageous for the demolding of the injection molded container lid.

In order to ensure an exchange of air between the inner region of the box and the container surroundings, the container lid, in a further advantageous configuration, has at least one ventilation opening. If, for example, hot foods are introduced into the inner region of the box, the box opening is completely closed by the container lid and the container is subsequently placed in the refrigerator, then cooling of the foods can result in a negative pressure in the inner region of the box. This makes it more difficult for a user to open the container at a later point in time. Furthermore, an insufficient exchange of air can result in unpleasant odors and in the foods perishing prematurely. Therefore, the at least one ventilation opening increases the operability of the container and further improves the capability of the latter to store food. The invention here can also provide for the container lid to have a plurality of ventilation openings.

In order, on the one hand, to bind as many drops of condensation as possible in the hollow bodies and, on the other hand, to ensure an optimum exchange of air between the inner region of the box and the container surroundings, a further advantageous configuration of the container according to the invention provides for the at least one ventilation opening to be arranged in the region of the three-dimensional surface structures. In order, in addition, to simplify the production of the container in the injection molding process, it is possible for a respective ventilation opening preferably to have a diameter which is identical to that of a top surface of the hollow body basic shape.

It is generally known that fruit and vegetables form, inter alia, gaseous ethylene, and emit this to the ambient air, as they ripen. Ethylene is a gaseous hydrocarbon compound ($C_2H_4$) which acts as a phytohormone or plant hormone in plants. For example, it causes fruit and vegetables which are adjacent to one another to ripen. When fruit and vegetables are being stored in the containers which are known from the prior art, an increase in the concentration of ethylene in the inner region of the box therefore results in premature ripening and subsequent perishing of the entire contents. On account of this, the containers which are known from the prior art are distinguished by being able to store fruit and vegetables only for a small amount of time.

In order further to increase the ability of the container according to the invention to store, in particular, fruit and vegetables, a further advantageous configuration of the container according to the invention therefore provides for the container lid to have arranged on it an interchangeable filter, which essentially completely covers the at least one ventilation opening. It is possible for said filter to serve for the absorption and/or oxidation of ethylene or other gaseous compounds and to have, for example, activated carbon or an ethylene absorber based on potassium permanganate ($KMnO_4$) or zeolites coated in manganese dioxide ($MnO_2$). Said zeolites are crystalline and porous aluminosilicates which are coated with manganese dioxide. On account of their oxidizing properties, the manganese dioxide and the potassium permanganate can cause the gaseous ethylene to oxidize, as a result of which it loses its ripening effect in relation to adjacent fruit or vegetables. The products which are formed during the oxidation can be stored in the pores of the zeolites or absorbed thereby. The filter therefore optimizes the ability of the container to store fruit and vegetables.

The invention here provides for the filter to be arranged on an outer side of the container lid, said outer side being directed away from the inner region of the box. In this case, it is possible for the ethylene-containing air first of all to pass through the at least one ventilation opening and then to be absorbed by the filter. The ethylene can subsequently be absorbed by the activated carbon or oxidized by the manganese dioxide. Conversely, it is possible for air to pass through the filter from the container surroundings, and to pass through the at least one ventilation opening, before it penetrates into the inner region of the box. This ultimately ensures an optimum exchange of air between the surroundings of the container and the inner region of the box and minimizes the concentration of ethylene. This has a positive effect on the ability of the container to store foods.

The above described filter has usually just a limited absorption capacity and/or a limited oxidation capacity in relation to ethylene or other gaseous compounds, and therefore has to be changed over at regular intervals by a user. In order for it to be possible for the filter to be retained in a releasable manner on the container lid, and thus also changed over, a further advantageous configuration of the container according to the invention provides for at least one filter cap to be arranged in a releasable manner on the container lid. The invention here provides for said filter cap preferably to comprise at least one latching means, which allows the filter cap to be fixed temporarily on the container lid. The filter cap therefore makes it possible for use to be made of interchangeable filters which do not require any additional filter holder. This ultimately has a positive effect on the production capability, and the production costs, of said filters and therefore of the container.

In order that the above described exchange of air between the inner region of the container and the container surroundings is not obstructed by the filter cap, the filter cap, in a further advantageous configuration of the container according to the invention, has at least one air through-passage.

In a further advantageous configuration of the container according to the invention, the container lid has a depression, in which depression the filter can be arranged. The depression is preferably arranged in the region of the three-dimensional surface structure. If the depression is located on a side which is located essentially opposite the three-dimensional surface structure, i.e. on the outer side of the container lid, then the filter can be placed, or inserted, into the depression such that it terminates essentially flush with a container-lid surface and does not protrude. This arrangement of the filter in the depression where the filter is flush with the container-lid surface makes it easier for a plurality of containers to be stacked one above the other.

In order further to improve the fit of the filter in the depression, the depression preferably has a frame-like surround. The filter can be inserted into, and removed again from, said frame-like surround. Said frame-like surround provides for precisely fitting insertion of the filter and thus prevents the filter from sliding laterally in the depression. The invention here provides for said frame-like surround either to be of circumferentially closed design or to have at least one interruption in its circumference.

In a further advantageous configuration of the container according to the invention, the container lid essentially comprises a lid base and a skirt, which encircles said base around the periphery, wherein the three-dimensional surface structure is arranged in the region of the lid base. In this preferred configuration, the box opening can be closed by the container lid either such that the latter is inserted into the box opening, and the skirt is thus encompassed by the upper box periphery, or such that the skirt essentially encloses the upper box periphery as it is placed in position. In the latter case, the container lid is therefore designed in the form of a slip-on lid.

In the case of such a configuration of the container lid, the depression, in a further advantageous configuration of the container according to the invention, can extend essentially over the lid base and/or the skirt. This makes it possible to use filters with different dimensions.

In a further advantageous configuration of the container according to the invention, the filter cap is of essentially U-shaped design in cross section with a first limb and a second limb for positioning on the skirt of the container lid and with a crosspiece, which connects said limbs, wherein the filter cap can be inserted into the depression such that it essentially completely covers the depression, the frame-like surround of the depression and the filter, which is arranged in the frame-like surround. This means, in particular, that the filter can be essentially completely covered by the crosspiece of the filter cap. In the case of this configuration, the above described latching means can preferably be arranged in the region of the two limbs and latch into complementary undercuts in the skirt of the container lid.

As already described above, a sufficient exchange of air with the surroundings is also important for the container to be able to store foods. In order for this exchange of air also to be ensured in the case of a U-shaped configuration of the filter cap, a further advantageous configuration of the container according to the invention provides for the air through-passage to be arranged in the region of the first and/or of the second limb of the filter cap and to be preferably of slot-like design. In particular when a plurality of containers are stacked one above the other, it is thus possible for an exchange of air to take place between the inner region of the box and the surroundings.

In order to increase the functionality of the container further, the container, in a further advantageous configuration, has at least one basket insert, which can be inserted into, and removed again from, the inner region of the box. Said basket insert makes it easier for foods to be placed in, or removed from, the inner region of the container. Should the absorption capacity of the three-dimensional surface structure be insufficient as far as condensation is concerned, and should the condensation which runs off and drips down therefore collect in the region of the container base, then the foods which are stored in the basket insert do not come into contact with said condensation. In particular, however, the problem with food containers of the present kind is that condensation can form not just on the inner side of the container lid, but also in the interior of the box, i.e. in particular on the side wall thereof. The provision of a basket insert prevents the situation where the foods stored in the container come into contact with any condensation formed on the side wall of the box. Not least, the basket insert prevents the foods from resting directly on the box base. Foods resting on the box base can be very disadvantageous since there is a risk of condensation which is formed on the box wall draining off in the direction of the box base and possibly collecting there.

The combination of the three-dimensional surface structure according to the invention on the inner side of the container lid and the basket insert, which is preferably present, consequently prevents, in a particularly effective manner, the situation where foods which are stored in the container come into contact, or remain in contact, with any condensation which forms preferably on the inner side of the container lid, and on the side wall of the box, and possibly collects on the box base.

In order that the basket insert can be straightforwardly removed from the inner region of the container by a user, said basket insert can preferably have at least one handle. Said handle can be gripped by the user in order for the basket insert to be removed from the inner region of the box.

In a preferred development of the container, the basket insert is designed in the form of a sieve. Foods which are located in the sieve can first of all be washed by the user, whereupon the sieve can be inserted into the inner region of the box. Moreover, any condensation which is formed on the foods can drain off through the sieve openings, and therefore the foods are not in any long-term contact with the condensation.

BRIEF DESCRIPTION OF THE DRAWINGS

An exemplary embodiment of the container configured according to the invention will be explained and described in more detail with reference to the accompanying drawings, in which.

DETAILED DESCRIPTION OF THE PREFERRED EMBODIMENTS

Figure 1:
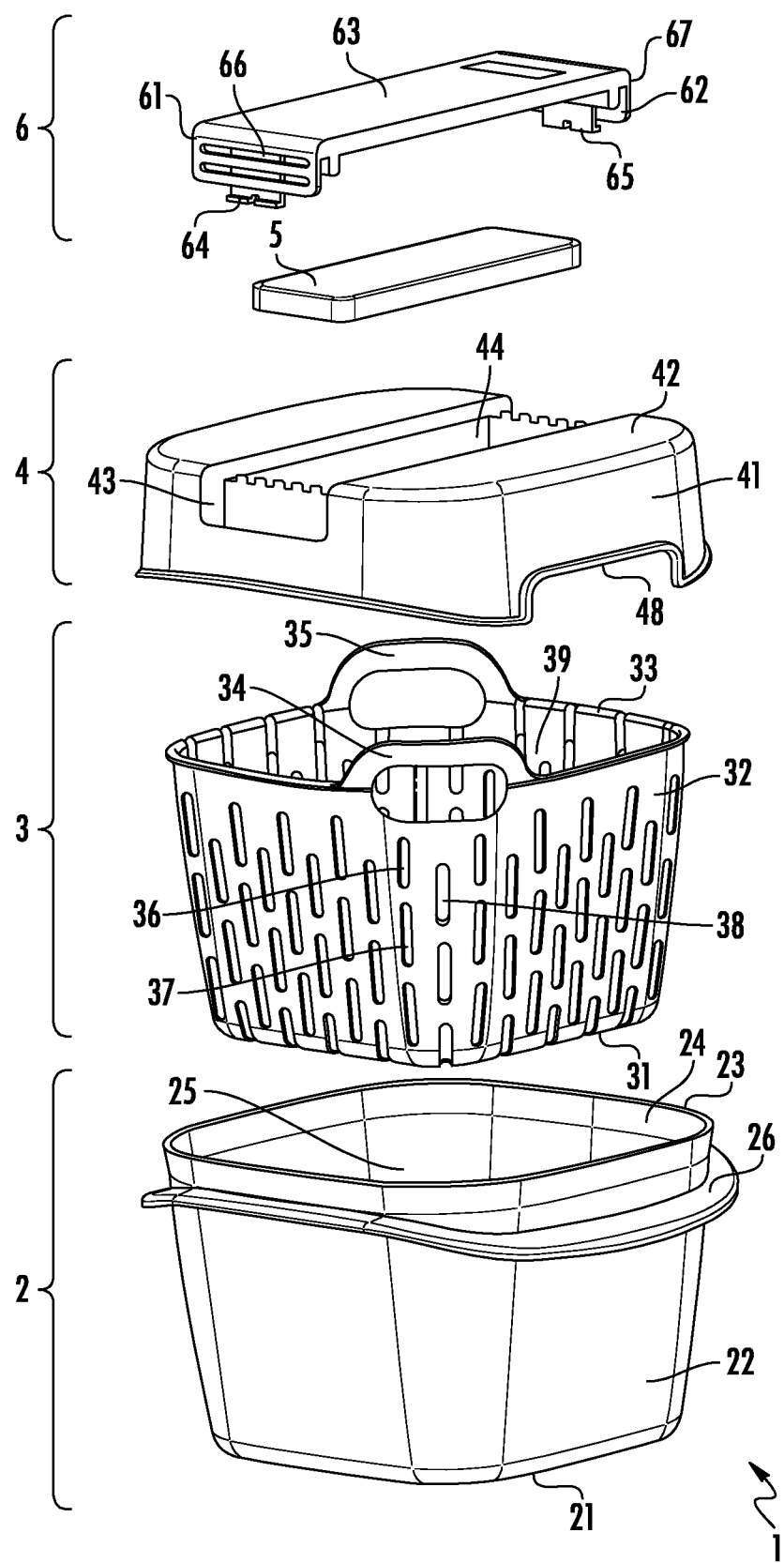
FIG. 1 shows an exploded illustration of an exemplary embodiment of a container according to the invention.

FIG. 1 shows an exploded illustration of an exemplary embodiment of a container 1 which is configured according to the invention and has a box 2, a basket insert 3, a container lid 4, a filter 5 and a filter cap 6. In the present exemplary embodiment, with the exception of the filter 5, all the constituent parts of the container 1 according to the invention are designed in the form of injection moldings made of polypropylene.

The box 2 comprises a box base 21 and an encircling side wall 22, which is bounded by an encircling, upper box periphery 23. The box periphery 23 encloses a box opening 24. The basket insert 3 can be inserted into an inner region 25 of the box 2 through said box opening 24. In the absence of the basket insert 3, it is also possible for fruit, vegetables or other foods to be introduced, or placed, directly into said inner region 25 of the box 2. In the present exemplary embodiment, the upper box periphery 23 has a larger diameter than the box base 21. Since the box periphery 23 and the box base 21 are connected to one another by the side wall 22, the box 2 therefore has a conical shape. This conical shape of the box 2 results from the box 2 being produced by injection molding and has the advantage that, in the case of a plurality of such containers 1 being stored, individual boxes 2 can be positioned one inside the other. The ability to nest a plurality of boxes 2 results in a considerably smaller amount of space being required to store the containers 1.

The basket insert 3 is dimensioned to be smaller than the box 2, and therefore the basket insert 3 can be inserted into the inner region 25 of the box 2. The basket insert 3 comprises a basket insert base 31, a basket-insert wall 32 and an upper, encircling basket insert periphery 33. In the present exemplary embodiment of the container 1, the region of the upper basket-insert periphery 33 has arranged in it two handles 34, 35, which are arranged essentially opposite one another and were formed in one piece with the upper basket-insert periphery 33 by injection molding. A user can use these two handles 34, 35 so as to straightforwardly insert the basket insert 3 into the inner region 25 of the box 2 and remove the same from said inner region 25 again. In the present exemplary embodiment, the basket insert 3 is designed in the form of a sieve and therefore has a multiplicity of slot-like sieve openings 36, 37, 38. On account of the basket insert 3 being produced by injection molding, it is also the case that said basket insert has an essentially conical shape.

The container lid 4 serves to close the box opening 24. In the present exemplary embodiment, the container lid 4 comprises an essentially encircling skirt 41 and a lid base 42 and is designed in the form of a slip-on lid. The container lid 4 can be positioned on the upper periphery 23 of the box 2 such that its skirt 41 essentially encloses the upper box periphery 23. For an optimum fit of the container lid 4, the side wall 22 of the box 2 has an encircling overhang 26, on which the skirt 41 can be positioned.

In the present exemplary embodiment, the filter 5 is of essentially cuboidal design and has an ethylene absorber based on activated carbon or zeolites coated in manganese dioxide. In order for the filter 5 to be arranged on the container lid 4, the container lid 4, in the present exemplary embodiment, has a depression 43 with a frame-like surround 44 formed therein. The depression 43 extends over the lid base 42 and to some extent over the skirt 41.

A user can insert the filter 5 in an essentially precisely fitting manner into the frame-like surround 44. As a result, the frame-like surround 44 prevents the filter 5 from sliding laterally in the depression 43. In order that it is also possible to prevent the filter 5 from falling vertically out of the depression 43 or the frame-like surround 44, in the present exemplary embodiment the filter cap 6 is inserted into the depression 43 such that it essentially completely covers the depression 43, the frame-like surround 44 and the filter 5, which is arranged in the frame-like surround 44 (see also FIG. 4). For this purpose, the filter cap 6 is of essentially U-shaped design in cross section with a first limb 61, a second limb 62 and a crosspiece 63, which connects said limbs 61, 62. In order that the filter cap 6 can be arranged in a releasable manner in the depression 43, latching means 64, 65 designed in the form of latching noses are arranged in the region of the two limbs 61, 62. When the filter cap 6 is inserted into the depression 43, the latching means 64, 65 latch into complementary undercuts in the region of the depression (not illustrated in FIG. 1; see FIG. 4). Furthermore, the filter cap 6 has a plurality of air through-passages 66, 67, which are designed like slots and ensure an exchange of air between the inner region 25 of the box 2 and the container surroundings.

Figure 2:
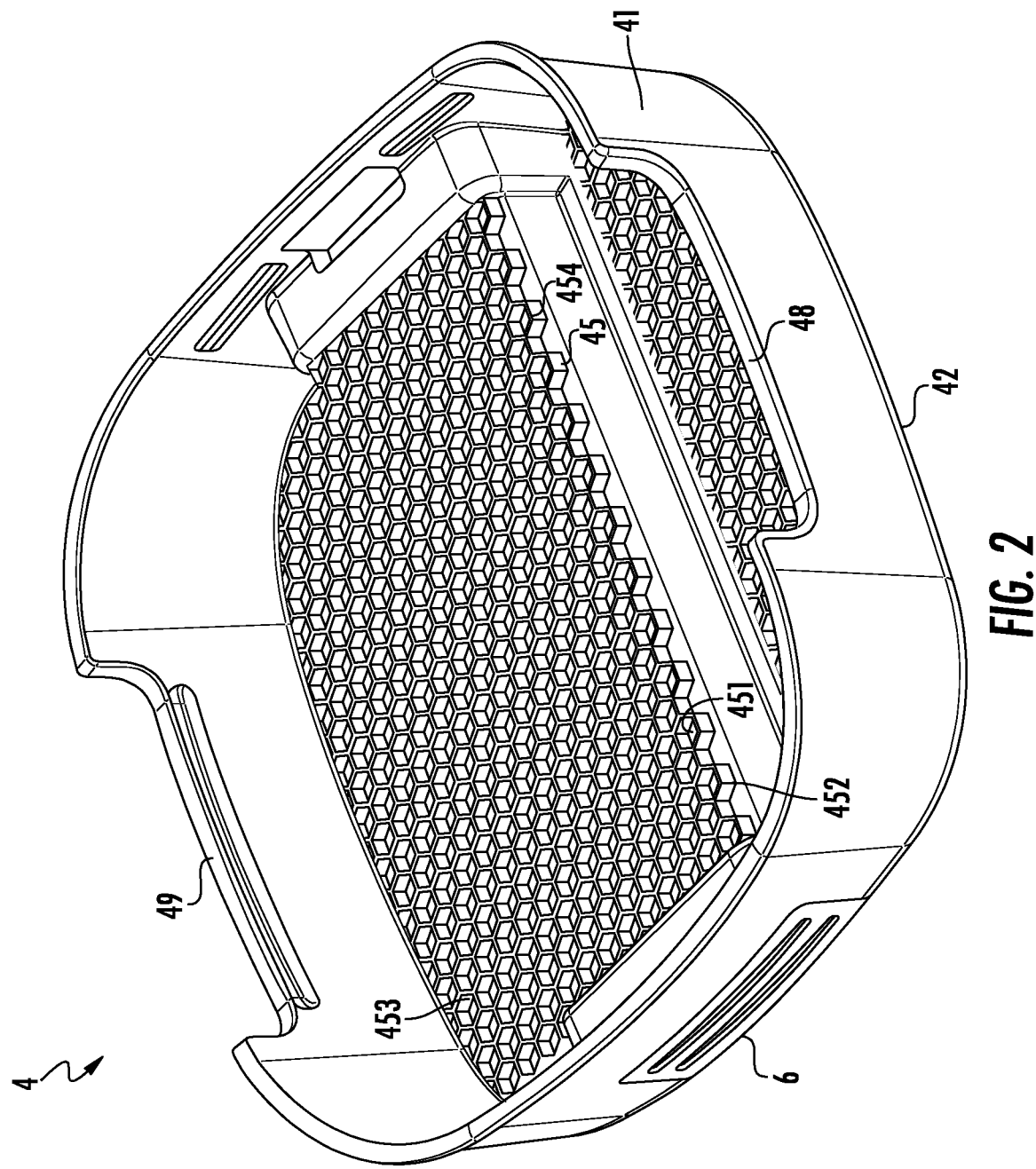
FIG. 2 shows a perspective view from beneath of the container lid of the exemplary embodiment from FIG. 1 with a three-dimensional surface structure.

FIG. 2 shows a perspective view from beneath of the container lid 4 of the exemplary embodiment from FIG. 1. On a side which is located opposite the depression 43, i.e. on the inner side, which is directed toward the inner region 25 of the box 2, the container base 42 has a three-dimensional surface structure 45. Said three-dimensional surface structure 45 is designed in the form of a plurality of adjacent hollow bodies 451 having a bottom surface 452, which is arranged on the container lid, a top surface 453, which is oriented in the direction of the inner region of the box 2, and a lateral surface 454, which connects the bottom surface 452 and the top surface 453 to one another. The top surface 453 is open in each case. In the present exemplary embodiment, the bottom surface 452 and the top surface 453 are of polygonal design, wherein the bottom surface 452 and the top surface 453 have a number of corner points n, where n=6. The bottom surface 452 and the top surface 453 are essentially congruent in relation to one another. In addition, all the hollow bodies 451 are bounded, and separated from adjacent hollow bodies 451, by their lateral surface 454.

In the present exemplary embodiment, this therefore results in the three-dimensional surface structure 45 being in the form of a honeycomb structure. This means that the three-dimensional surface structure 45 of the container lid 4 reproduces a honeycomb.

The moisture which is emitted by the foods, or is introduced into the container 1 by the foods, while the latter are being stored is—as already described above—discharged to the ambient air in the inner region 25 of the box 2. This takes place in particular when the container 1 is placed in the refrigerator, and stored there. This means that the air humidity in the inner region 25 of the box 2 increases in the case of the box opening 24 being closed by the container lid 4. This increase in the air humidity can result in the formation of condensation, which is deposited in the form of individual drops of condensation preferably on that side of the container lid 4 which is directed toward the inner region of the box 2. The three-dimensional surface structure 45, which is designed in the form of a honeycomb structure, means that said drops of condensation can be deposited in the region of the lateral surface 454 and of the bottom surface 452 of the hollow bodies 451, by virtue of the moisture-containing air entering into an interior of the hollow bodies 451 through the top surface 453.

Individual drops of condensation formed during the condensing process can form a plurality of points of contact with the lateral surface 454 and/or the bottom surface 452 of the hollow body 451. This formation of a plurality of points of contact results in an increase in the force of adhesion between the drops of condensation and the inner side of the container lid 4. This means that drops of condensation are better retained in the hollow body 451, instead of, as is the case with a container lid without a three-dimensional surface structure, running off and dripping onto the foods. This ultimately means that contact between the foods and the condensation, and formation of bacteria and mold on the foods, is reduced or even prevented altogether. The three-dimensional surface structure 45 therefore results in the container 1 being able to store foods in an improved manner in relation to the containers which are known from the prior art. In the present exemplary embodiment, that side of the container base 42 which is directed toward the inner region 25 of the box 2 is essentially completely covered by the three-dimensional surface structure 45. However, the invention also provides for just part of the container base to have three-dimensional structuring. In the present exemplary embodiment, the hollow bodies 451 have an extremely small inside width, i.e. a distance between in each case two parallel, rectilinear portions of the lateral surface 454 of 4.511 mm. The depth of the hollow bodies 451, that is to say the crosspiece height of the lateral surfaces 454, is 1.9 mm here, which gives a volume for the hollow bodies 451 of approximately 34 microliters. This corresponds to a small drop (a standard-sized drop, in pharmaceutical terms, contains 50 microliters), and this makes it difficult for larger drops of condensation to be formed. It is also the case that the formation of a vacuum beneath a drop which is tending to become detached is promoted as a result of these dimensions.

Figure 3:
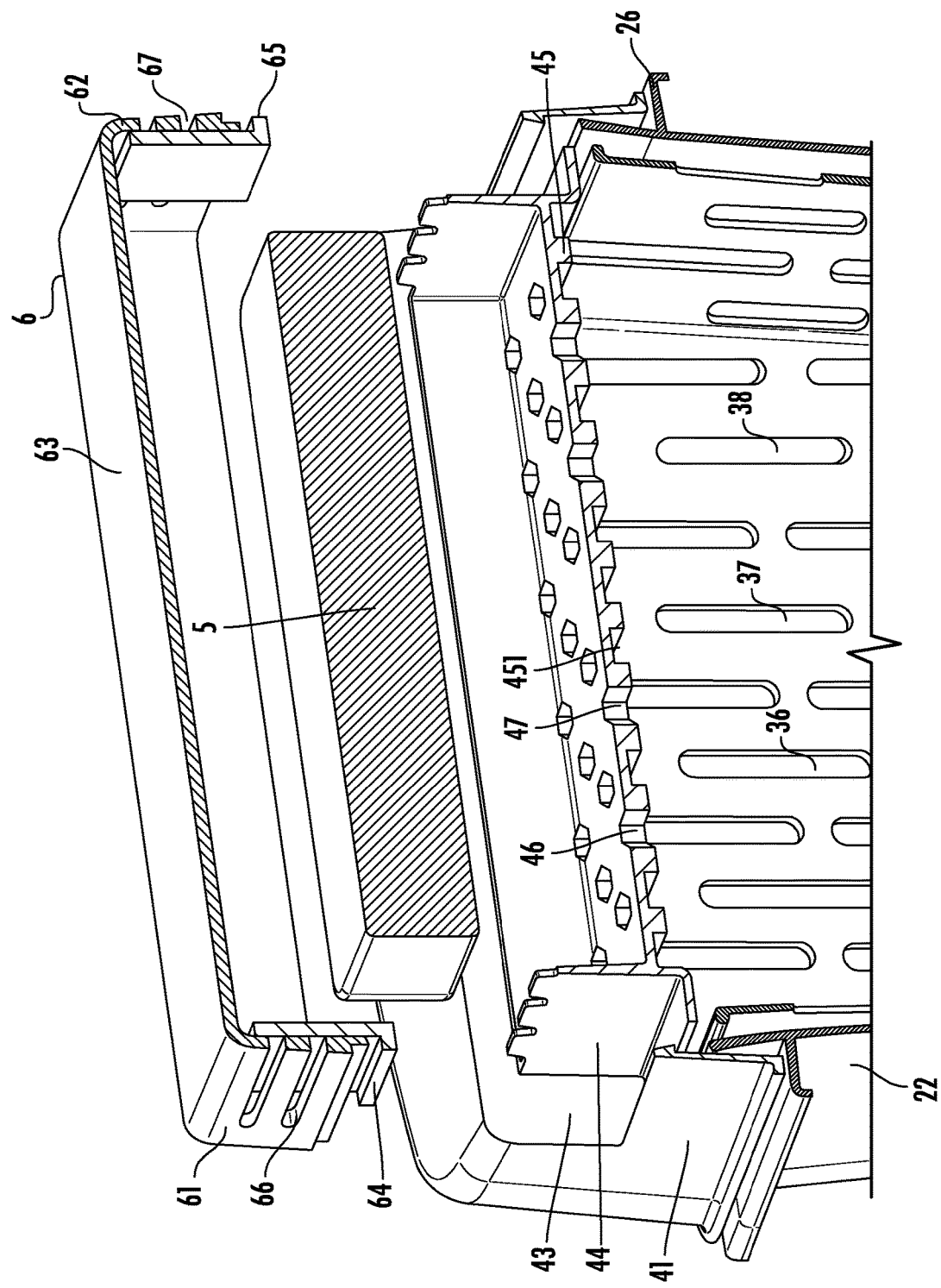
FIG. 3 shows a partially exploded and sectional illustration of a detail of the exemplary embodiment from FIG. 1.

FIG. 3 shows a partially exploded and sectional illustration of a detail of the exemplary embodiment from FIG. 1. In this figure, the basket insert 3 can be seen in the state in which it has been inserted into the inner region 25 of the box 2. As can also be seen, the basket insert 3 is dimensioned to be smaller than the box 2 and/or the inner region 25 thereof.

This means that a distance is maintained between the basket-insert wall 32 and the side wall 22 of the box 2. This has the advantage that the basket insert 3 and foods which are stored therein do not come into contact with condensation, which can possibly also be deposited in the region of the side wall 22 of the box 2. Consequently, for reasons mentioned above, the formation of bacteria and mold on the foods which are stored in the basket insert 3 can be further reduced or even prevented altogether.

When the container lid 4 is positioned on the upper box periphery 23, the skirt 41 of the container lid 4 completely encloses the upper periphery 23 of the box 2 and is seated on the encircling overhang 26 of the side wall 22. This ensures an optimum fit of the container lid 4 upon closure of the box opening 24. As can also be seen from FIG. 3, the lid base 42 has a multiplicity of ventilation openings 46, 47 in the region of the frame-like surround 44. As already mentioned above, said ventilation openings 46, 47 provide for an exchange of air between the inner region 25 of the box 2 and the container surroundings. In the present exemplary embodiment, said ventilation openings 46, 47 are arranged to correspond to bottom surfaces 452 of hollow bodies 451. This allows the air to pass out of the inner region 25 of the box 2 into the surroundings in the first instance through the hollow bodies 451, and then through the ventilation openings 46, 47. In order nevertheless, alongside this exchange of air, for sufficient hollow bodies 451 to be provided for the purpose of collecting and/or retaining drops of condensation, the number of ventilation openings 46, 47 is smaller than the number of hollow bodies 451.

Figure 4:
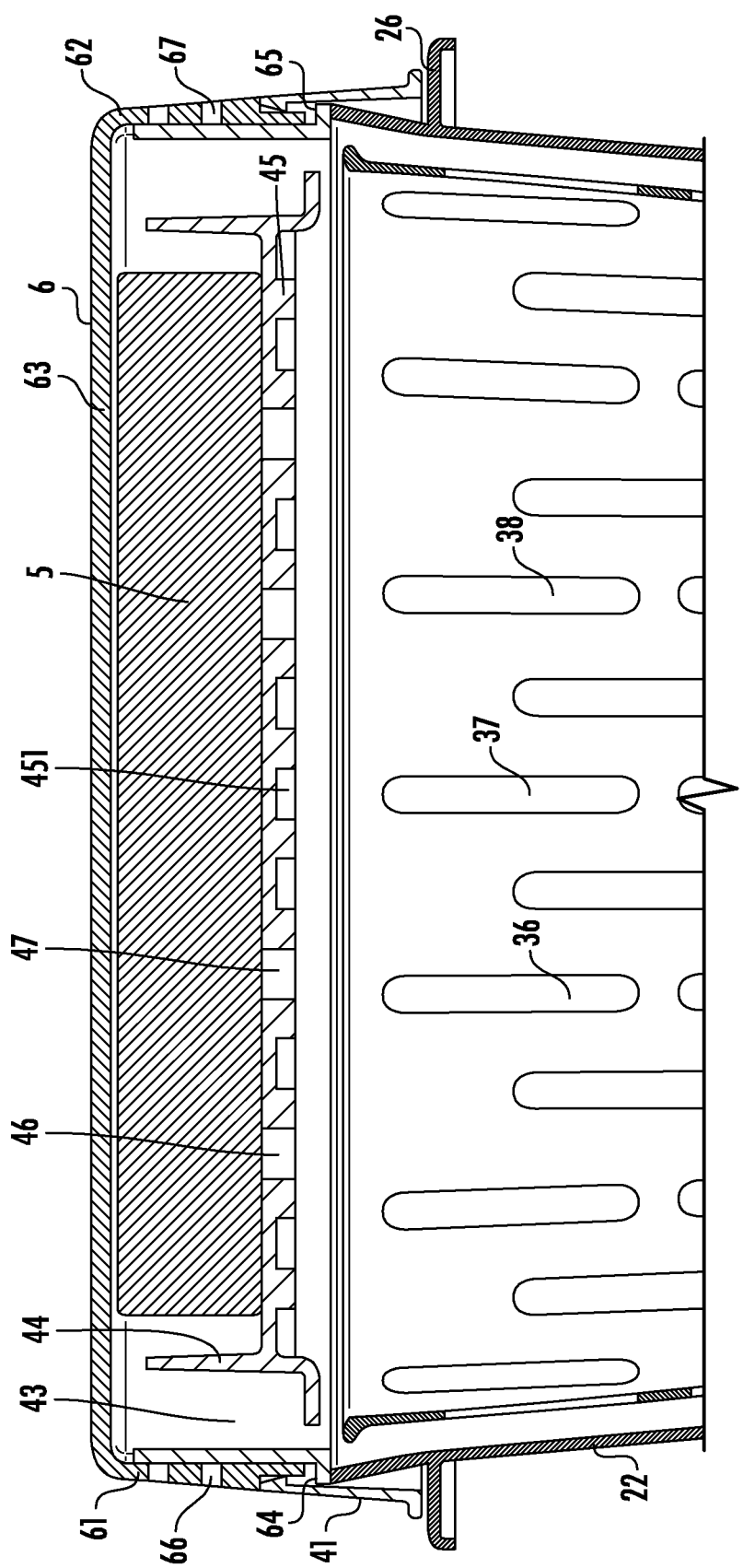
FIG. 4 shows a sectional illustration of a further detail of the exemplary embodiment from FIG. 1.

FIG. 4 shows a sectional illustration of a further detail of the exemplary embodiment from FIG. 1. The filter 5 here has been placed, or inserted, into the frame-like surround 44 of the container lid 4. The filter 5 here covers over all the ventilation openings 46, 47 arranged in the region of the frame-like surround 44 of the lid base 42.

By virtue of the filter 5 being inserted into the frame-like surround 44, the filter is retained by said surround 44 such that the filter 5 is safeguarded against sliding laterally in the region of the depression 43 of the container lid 4. The filter cap 6 is inserted into the depression 43 such that the latching means 64, 65, which are designed in the form of latching noses, are latched into complementary undercuts of the container lid. The filter 5 is consequently enclosed between the lid base 42 in the region of the frame-like surround 44 and the crosspiece 63 of the filter cap 6 in a sandwich-like manner. The filter 5 is thus safeguarded against falling out of the frame-like surround 44 in the vertical direction.

As already explained above, it can also be seen from FIG. 4 that the number of ventilation openings 46, 47, each of which is arranged to correspond to the bottom surface 452 of a hollow body 451, is smaller than the number of hollow bodies 451 of the three-dimensional structure 45. This ensures an optimum exchange of air between the inner region 25 of the box 2 and the container surroundings. Furthermore, despite the ventilation openings 46, 47 in the hollow bodies 451, which are not arranged in the region of the ventilation openings 46, 47, it is still possible for condensation of air humidity, and therefore formation of drops of condensation, to take place.

Figure 5:
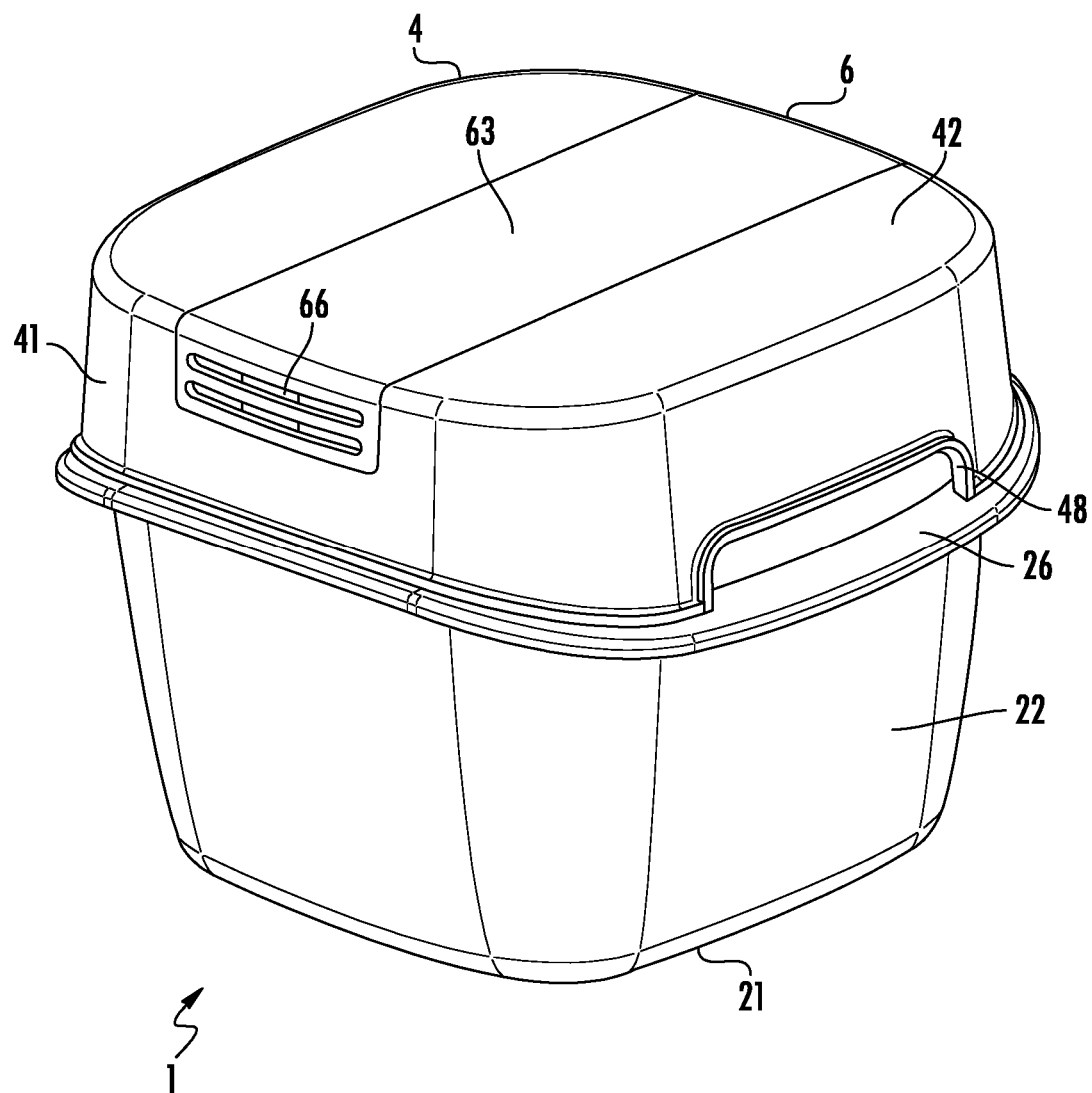
FIG. 5 shows a perspective illustration of an outer view of the exemplary embodiment from FIG. 1.

FIG. 5 shows a perspective illustration of an outer view of the exemplary embodiment from FIG. 1. FIG. 5 shows that, in the state in which it has been inserted into the depression 43, the filter cap 6 terminates flush with the surface of the container lid 4. This flush arrangement of the filter cap 6 allows a plurality of containers 1 to be stacked one above the other without obstruction. Furthermore, the container lid 4 has two recesses 48, 49 in the region of the skirt 41. By using his or her hands to grip these two recesses 48, 49, a user can straightforwardly remove the container lid 4 from the upper periphery 23 of the box 2, without there being any need for an additional retaining handle to be arranged on the container lid 4.

The invention claimed is:

1. A container (1) made of injection molded plastic, for storing foodstuffs, comprising a box (2) having a box base (21), a side wall (22) and a generally encircling, upper box periphery (23), which defines a box opening (24), and further comprising a container lid (4) for at least partially closing the box opening (24), wherein on an inner side, which is directed toward an inner region (25) of the box (2), the container lid (4) has a three dimensional surface structure (45) which comprises a plurality of respectively adjacent hollow bodies (451), whose shape has a respective bottom surface (452), which is arranged on an inner side of the container lid (4), a top surface (453), which is oriented in the direction of the inner region (25) of the box (2), and a lateral surface (454), which connects the bottom surface (452) and the top surface (453) to one another, wherein at least part of the hollow bodies (451) are open in the direction of the inner region (25) of the box (2), the hollow bodies (451) are configured to retain drops of condensation in the hollow bodies via the hollow bodies being structured such that a drop of condensation with dimensions of 40 to 50 microliters contacts essentially all sides that define the lateral surface of the hollow body and, as a result, a contact surface area between the drop of condensation and the hollow body is such that the drop of condensation is retained within the hollow body due to a force of adhesion between the drop of condensation and the hollow body being greater than a force of cohesion of the drop of condensation, and the container lid has at least one ventilation opening arranged in a region of the three dimensional surface structure, with at least one interchangeable filter that covers the at least one ventilation opening.

2. The container (1) as claimed in claim 1, wherein generally all of the hollow bodies (451) are produced, and separated from adjacent hollow bodies (451), by crosspieces which are injection molded onto the container lid (4) and form the lateral surfaces (454) of the hollow bodies.

3. The container (1) as claimed in claim 1, wherein at least one of the bottom surface (452) or the top surface (453) of a basic shape of the hollow bodies (451) is of polygonal, elliptical or circular design, wherein, in the case of a polygonal design, at least one of the bottom surface (452) or the top surface (453) has a number of corner points n ranging from n=3 to n=10.

4. The container (1) as claimed in claim 1, wherein the bottom surface (452) and the top surface (453) are generally congruent in relation to one another.

5. The container (1) as claimed in claim 1, wherein at least one filter cap (6) is arranged in a releasable manner on an outer side of the container lid (4), said outer side being directed away from the inner region (25) of the box (2), wherein the filter cap (6) covers over the at least one interchangeable filter (5) on the container lid (4) and has at least one air through passage (66, 67).

6. The container (1) as claimed in claim 1, wherein, the container lid (4), on an outer side thereof, has a depression (43) for the at least one interchangeable filter (5), wherein the depression (43) is arranged in the region of the three dimensional surface structure (45).

7. The container (1) as claimed in claim 6, wherein the depression (43) has a frame like surround (44) for the reversible insertion of the at least one interchangeable filter (5).

8. The container (1) as claimed in claim 1, wherein the container lid (4) comprises a lid base (42) and a skirt (41), which encircles said base around the periphery, wherein the three dimensional surface structure (45) is arranged in the region of the lid base (42).

9. The container (1) as claimed in claim 8, wherein the depression (43) generally extends over at least one of the lid base (42) or the skirt (41).

10. The container (1) as claimed in claim 6, wherein the filter cap (6) is of a generally U-shaped design in cross section with a first limb (61) and a second limb (62) for positioning on the skirt (41) and with a crosspiece (63) which connects said limbs (61, 62), for insertion into the depression (43), and the filter cap can be inserted into the depression (43) such that the filter cap generally completely covers the depression (43), the frame like surround (44) and the at least one interchangeable filter (5), which is arranged in the frame like surround (44).

11. The container (1) as claimed in claim 10, wherein the at least one air through passage (66, 67) is arranged in a region of at least one of the first or of the second limb (61, 62) of the filter cap (6) and is of a slot like design.

12. The container (1) as claimed in claim 10, wherein the at least one air through passage (66, 67) is arranged in a region of at least one of the first or of the second limb (61, 62) of the filter cap (6) and is of a slot like design.

13. The container (1) as claimed in claim 1, wherein the container (1) further comprises at least one basket insert (3), which can be inserted into, and removed from, the inner region (25) of the box (2), wherein the basket insert (3) is designed in the form of a sieve.

14. The container (1) as claimed in claim 1, wherein the hollow bodies (451) each have a volume of 30 to 50 microliters.

15. The container (1) as claimed in claim 1, wherein the hollow bodies (451) each have a volume of 30 to 40 microliters.

16. The container (1) as claimed in claim 1, wherein the filter comprises activated carbon or an ethylene absorber based on potassium permanganate (KMnO4) or zeolites coted in manganese dioxide (MnO2).

* * * * *